(12) United States Patent
Senga et al.

(10) Patent No.: US 10,654,206 B2
(45) Date of Patent: May 19, 2020

(54) INJECTION MOLDING MACHINE

(71) Applicant: FANUC CORPORATION, Yamanashi (JP)

(72) Inventors: Masatoshi Senga, Yamanashi-ken (JP); Koichi Nishimura, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/020,321

(22) Filed: Jun. 27, 2018

(65) Prior Publication Data

US 2019/0009444 A1 Jan. 10, 2019

(30) Foreign Application Priority Data

Jul. 4, 2017 (JP) ................. 2017-130752

(51) Int. Cl.
*B29C 45/66* (2006.01)
*B29C 45/03* (2006.01)
*B29C 45/84* (2006.01)

(52) U.S. Cl.
CPC ............ *B29C 45/661* (2013.01); *B29C 45/03* (2013.01); *B29C 45/84* (2013.01)

(58) Field of Classification Search
CPC ...... B29C 45/661; B29C 45/681; B29C 45/84
USPC ..................... 425/153, 593, 451.6
See application file for complete search history.

(56) References Cited

U.S. PATENT DOCUMENTS

| | | | | |
|---|---|---|---|---|
| 6,164,947 | A * | 12/2000 | Miyahara | B29C 45/84 425/136 |
| 9,802,350 | B2 * | 10/2017 | Sasaki | B29C 45/661 |
| 2011/0151043 | A1 * | 6/2011 | Nishimura | B29C 45/84 425/152 |

FOREIGN PATENT DOCUMENTS

| | | |
|---|---|---|
| CN | 105729741 A | 7/2016 |
| DE | 102014007513 A1 | 12/2014 |
| JP | S51-029299 Y | 7/1976 |
| JP | 58-007631 | 1/1983 |
| JP | S63-029538 Y | 8/1988 |
| JP | 2003-112353 A | 4/2003 |
| JP | 2005-271287 A | 10/2005 |
| JP | 2006-007472 A | 1/2006 |
| JP | 2011-126251 A | 6/2011 |

OTHER PUBLICATIONS

Notification of Reasons for Refusal issued by the Japanese Patent Office in relation to Japanese Application No. 2017-130752 dated Jan. 22, 2019 (2 pages) along with English language translation (3 pages).

* cited by examiner

*Primary Examiner* — Peter L Vajda
*Assistant Examiner* — Asha A Thomas
(74) *Attorney, Agent, or Firm* — Robert P. Michal, Esq.; Carter, DeLuca & Farrell LLP

(57) ABSTRACT

An injection molding machine includes: a moving platen connected to a rear platen via a toggle link and configured to be moved closer to and away from a stationary platen; a guide rod support provided between the rear platen and the moving platen, and configured to support a guide rod for guiding a cross head of the toggle link; a safety rod fixed to the moving platen and extending toward the guide rod support; and a safety latch provided on the guide rod support and configured to restrict movement of the moving platen by engagement with the safety rod.

5 Claims, 7 Drawing Sheets

US 10,654,206 B2

INJECTION MOLDING MACHINE

CROSS-REFERENCE TO RELATED APPLICATION

This application is based upon and claims the benefit of priority from Japanese Patent Application No. 2017-130752 filed on Jul. 4, 2017, the contents of which are incorporated herein by reference.

BACKGROUND OF THE INVENTION

Field of the Invention

The present invention relates to an injection molding machine for forming molded articles.

Description of the Related Art

Japanese Laid-Open Patent Publication No. 2006-007472 discloses a technique in which, when a safety gate is opened, a safety rod moving integrally with a moving platen is locked by a safety latch provided in a rear platen, to restrict movement of the moving platen.

SUMMARY OF THE INVENTION

However, in the technique disclosed in Japanese Laid-Open Patent Publication No. 2006-007472, since the safety rod protrudes from the rear platen in a direction away from the moving platen when the moving platen is moved toward the rear platen, a problem occurs that the size of the injection molding machine is increased.

The present invention has been devised to solve the above problem, it is therefore an object of the present invention to provide an injection molding machine capable of suppressing increase in machine size.

According to an aspect of the present invention, an injection molding machine includes: a moving platen connected to a rear platen via a toggle link and configured to be moved closer to and away from a stationary platen; a guide rod support provided between the rear platen and the moving platen and configured to support a guide rod for guiding a cross head of the toggle link; a safety rod fixed to the moving platen and extending toward the guide rod support; and a safety latch provided on the guide rod support and configured to restrict movement of the moving platen by engagement with the safety rod.

According to the present invention, it is possible to suppress increase in size of the injection molding machine.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

First Embodiment

[Configuration of Injection Molding Machine]

Figure 1:
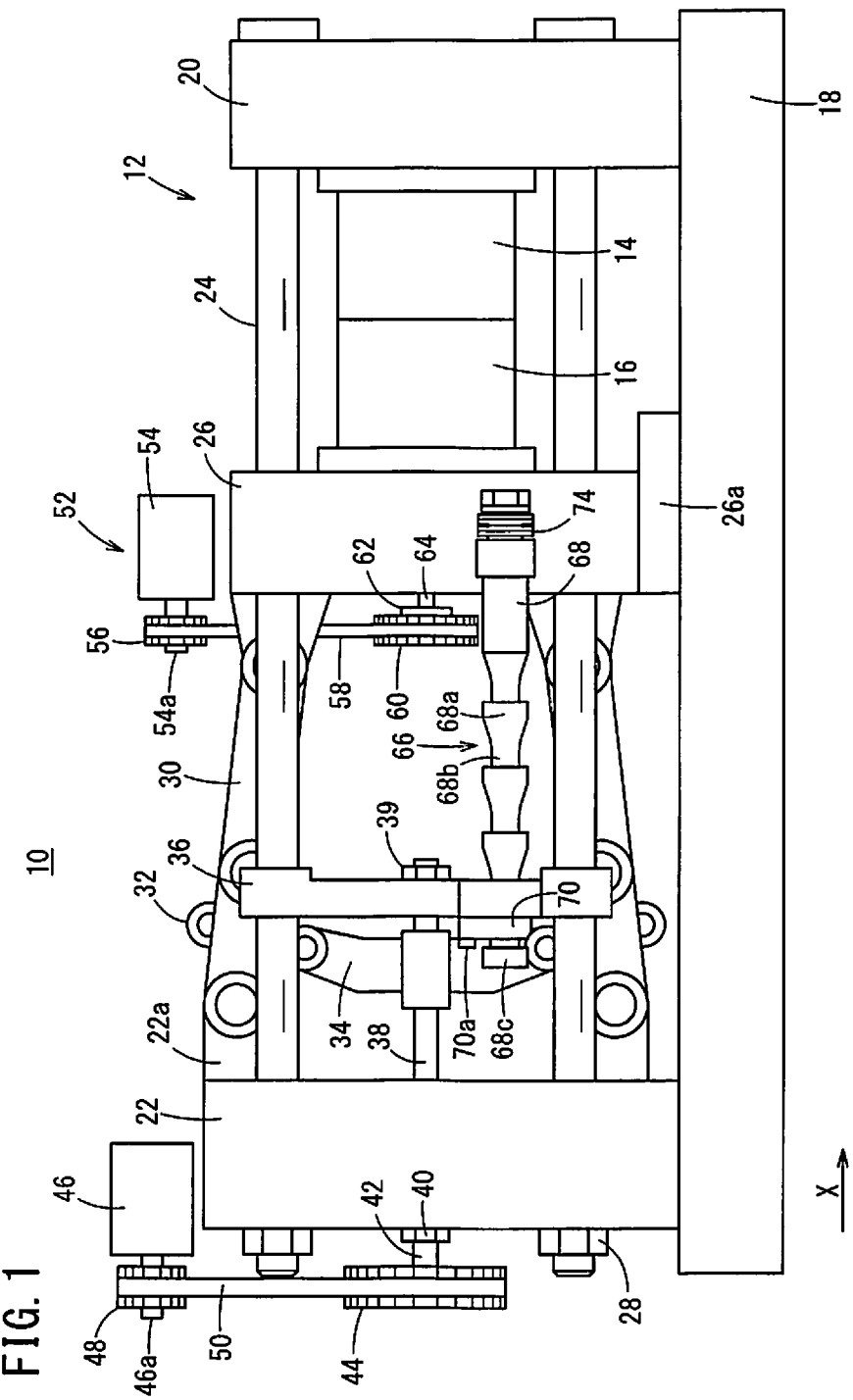
FIG. 1 is a view showing a schematic external configuration of a clamping device of an injection molding machine according to an embodiment of the present invention.
Figure 2:
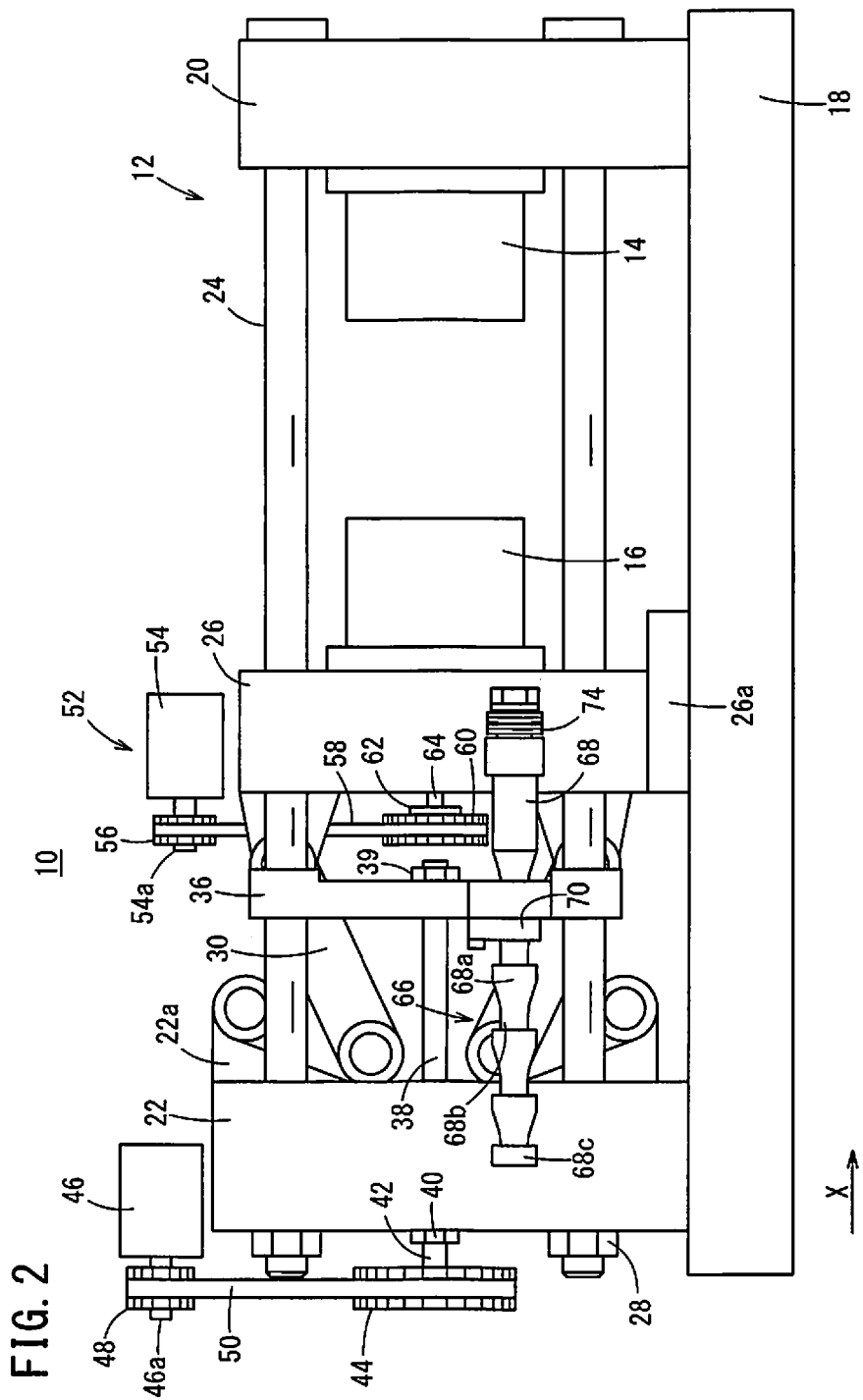
FIG. 2 is a view showing a schematic external configuration of a clamping device of an injection molding machine according to the embodiment.

FIGS. 1 and 2 are views showing a schematic external configuration of a clamping device 12 in an injection molding machine 10. FIG. 1 is a view showing a state in which a mold is closed. FIG. 2 is a view showing a state in which the mold is opened. The clamping device 12 is installed on a base frame 18. The clamping device 12 has a stationary platen 20, a rear platen 22, and four tie bars 24. The tie bars 24 connect the stationary platen 20 and the rear platen 22. The tie bars 24 are arranged parallel to each other. A moving platen 26 is provided between the stationary platen 20 and the rear platen 22. In FIG. 1, a direction in which the tie bars 24 extend is defined as X-axis direction, and more specifically a direction toward the stationary platen 20 is defined as a positive direction.

The moving platen 26 is installed on the base frame 18 via a slide plate 26a. The slide plate 26a is engaged with an unillustrated guide groove of the base frame 18. The moving platen 26 is provided on the base frame 18 so as to be movable in the X-axis direction along the guide groove. A space between the stationary platen 20 and the moving platen 26 forms a clamping space. A fixed mold half 14 is attached to the negative X-axis direction side of the stationary platen 20. A moving mold half 16 is attached to the positive X-axis direction side of the moving platen 26.

The tie bars 24 are arranged so as to pass through the rear platen 22. A mold height adjusting nut 28 is provided at an end of the tie bar 24 in the negative X-axis direction. By adjusting the amount of rotation of the mold height adjusting nut 28, the rear platen 22 is moved forward or backward (in the positive X-axis direction or negative X-axis direction) depending on the height of the fixed mold half 14 and the moving mold half 16. The mold height adjusting nut 28 is rotated by a mold height adjusting motor (not shown) or the like.

A toggle link 30 is provided between the rear platen 22 and the moving platen 26. The toggle link 30 is connected to a cross head 34 via a cross link 32. A guide rod support 36 is provided between the cross head 34 and the moving platen 26 in the X-axis direction. The guide rod support 36 is fixed to the tie bars 24. A guide rod 38 is provided so as to extend from the guide rod support 36 toward the negative X-axis direction side. The guide rod 38 is arranged parallel to the tie bars 24. An end of the guide rod 38 at the positive X-axis direction side is fixed to the guide rod support 36 by a nut 39, and another end thereof the negative X-axis direction side is fixed to the stationary platen 20 by a nut 40.

The cross head 34 is provided with an unillustrated ball screw nut, into which a ball screw shaft 42 is screw-engaged. The ball screw shaft 42 is rotatably supported by the rear platen 22. The ball screw shaft 42 penetrates through the rear platen 22 and extends to the negative X-axis direction side of the rear platen 22. A driven pulley 44 is rotatably mounted integrally on the ball screw shaft 42 at the negative X-axis direction side end of the ball screw shaft 42. A mold opening/closing motor 46 having a drive shaft 46a is arranged with its shaft parallel to the axis of the driven pulley 44. A drive pulley 48 is arranged on the drive shaft 46a so as to rotate integrally with the drive shaft 46a. A belt 50 is wound between the driven pulley 44 and the drive pulley 48.

When the mold opening/closing motor 46 is driven, the ball screw shaft 42 rotates (in clockwise or counterclockwise direction). By the rotation of the ball screw shaft 42, the cross head 34 connected to the ball screw nut moves forward or backward (in the positive X-axis direction or negative X-axis direction) on the ball screw shaft 42. As the cross head 34 moves, the moving platen 26 moves forward or backward (in the positive X-axis direction or negative X-axis direction) along the tie bars 24 via the cross link 32 and the toggle link 30. When the moving platen 26 moves forward, the moving mold half 16 abuts against the fixed mold half 14 to thereby close the mold. When the moving platen 26 moves rearward, the moving mold half 16 is separated from the fixed mold half 14 to thereby open the mold.

The clamping device 12 includes an ejector mechanism 52. The ejector mechanism 52 is a mechanism for taking out a molded article from the moving mold half 16. The ejector mechanism 52 includes an ejector motor 54, a drive pulley 56, a belt 58, a driven pulley 60, a ball screw nut 62 and a ball screw shaft 64.

The drive pulley 56 is arranged on a drive shaft 54a of the ejector motor 54 so as to rotate integrally with the drive shaft 54a. A belt 58 is wound between the drive pulley 56 and the driven pulley 60. A ball screw nut 62 is provided on the inner peripheral side of the driven pulley 60 so as to rotate integrally with the driven pulley 60. The ball screw nut 62 is screw-engaged with the ball screw shaft 64. An unillustrated ejector pin is coupled to a distal end of the ball screw shaft 64. A part of a distal end of the ejector pin is inserted into the moving mold half 16.

As the ejector motor 54 is driven, the ball screw nut 62 rotates (in clockwise or counterclockwise direction) via the drive pulley 56, the belt 58 and the driven pulley 60. As the ball screw nut 62 rotates, the ball screw shaft 64 moves forward or backward (in the positive X-axis direction or negative X-axis direction). As the ball screw shaft 64 moves, the ejector pin moves forward or backward (in the positive X-axis direction or negative X-axis direction). When the ejector pin moves forward, the molded article is pushed out from the moving mold half 16, so that the molded article is taken out from the moving mold half 16.

[Configuration of Safety Mechanism]

The clamping device 12 has a safety mechanism 66 for restricting movement of the moving platen 26 when an unillustrated safety gate is open. The safety mechanism 66 includes a safety rod 68 and a safety latch 70.

The safety rod 68 is a bar-shaped member extending in the X-axis direction, and an end of the safety rod 68 on the positive X-axis direction side is supported by the moving platen 26. As a result, the safety rod 68 moves forward or rearward (in the positive X-axis direction or negative X-axis direction) together with the moving platen 26. A disc spring 74 is interposed between the safety rod 68 and the moving platen 26 so that the moving platen 26 is relatively movable in the X-axis direction with respect to the safety rod 68 to a certain extent.

The safety rod 68 includes a plurality of locking parts 68a formed in a middle region thereof. The locking part 68a is formed such that the outside diameter gradually decreases from the positive X-axis direction side to the negative X-axis direction side. An end portion of the locking part 68a on the negative X-axis direction side has a step 68b, which is a plane substantially perpendicular to the X-axis and contiguous to another locking part 68a adjacent thereto on the negative X-axis direction side. A negative-X-axis-direction-side end portion of the locking part 68a located on the most negative X-axis direction side has a step 68b, which is contiguous to a large-diameter portion 68c formed at an end of the safety rod 68 on the negative X-axis direction side.

Figure 3:
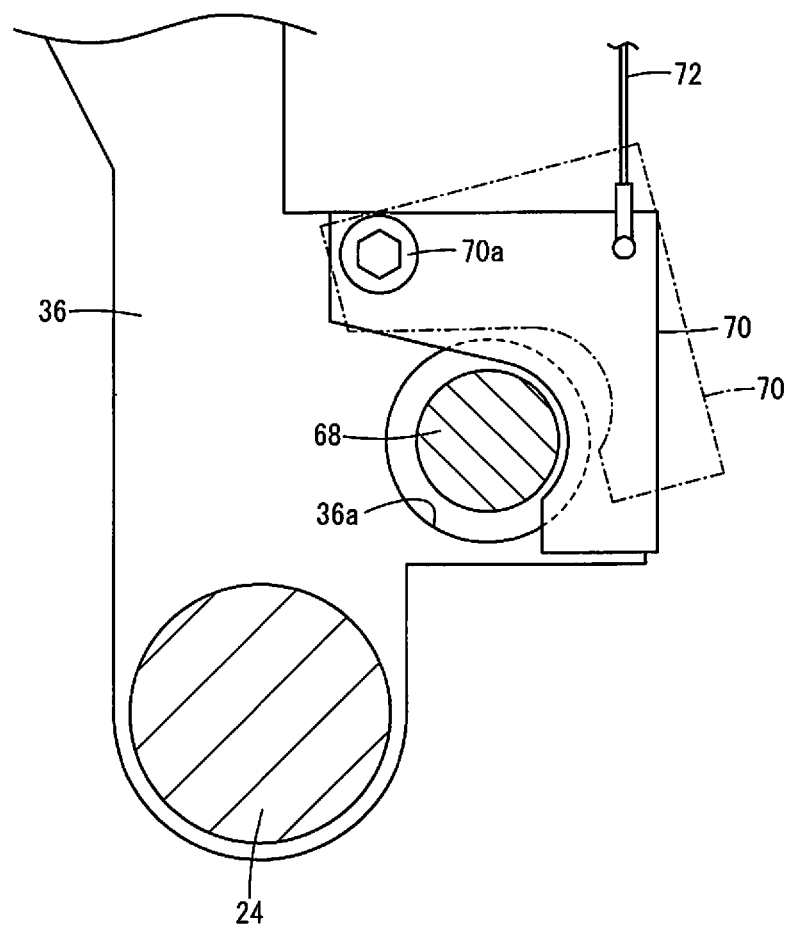
FIG. 3 is an enlarged view of the vicinity of a safety latch.

FIG. 3 is an enlarged view of the vicinity of the safety latch 70. In FIG. 3, the solid line shows the position of the safety latch 70 when the safety gate is open, and the one-dot chain line shows the position of the safety latch 70 when the safety gate is closed. The guide rod support 36 is provided with a through hole 36a through which the safety rod 68 passes. The safety latch 70 is arranged in the vicinity of the through hole 36a of the guide rod support 36. The safety latch 70 is formed in a hook shape along a small-diameter portion of the locking part 68a of the safety rod 68. The safety latch 70 is rotatably supported on the guide rod support 36 by a bolt 70a.

A safety wire 72 that operates in linkage with opening and closing of the safety gate is connected to the safety latch 70. When the safety gate is opened, the safety wire 72 moves downward so that the safety latch 70 becomes engaged with the locking part 68a of the safety rod 68. As a result, the safety latch 70 restricts movement of the moving platen 26 in the positive X-axis direction. Since the locking part 68a is formed such that the outside diameter gradually decreases from the positive X-axis direction side to the negative X-axis direction side, the safety latch 70 allows movement of the moving platen 26 in the negative X-axis direction even when the safety latch 70 is in engagement with the locking part 68a.

As described above, the disc spring 74 is arranged between the safety rod 68 and the moving platen 26. When the safety latch 70 becomes engaged with the safety rod 68 while the moving platen 26 is moving in the positive X-axis direction, the disc spring 74 absorbs impact acting on the moving platen 26.

[Operation and Effect]

Figure 4:
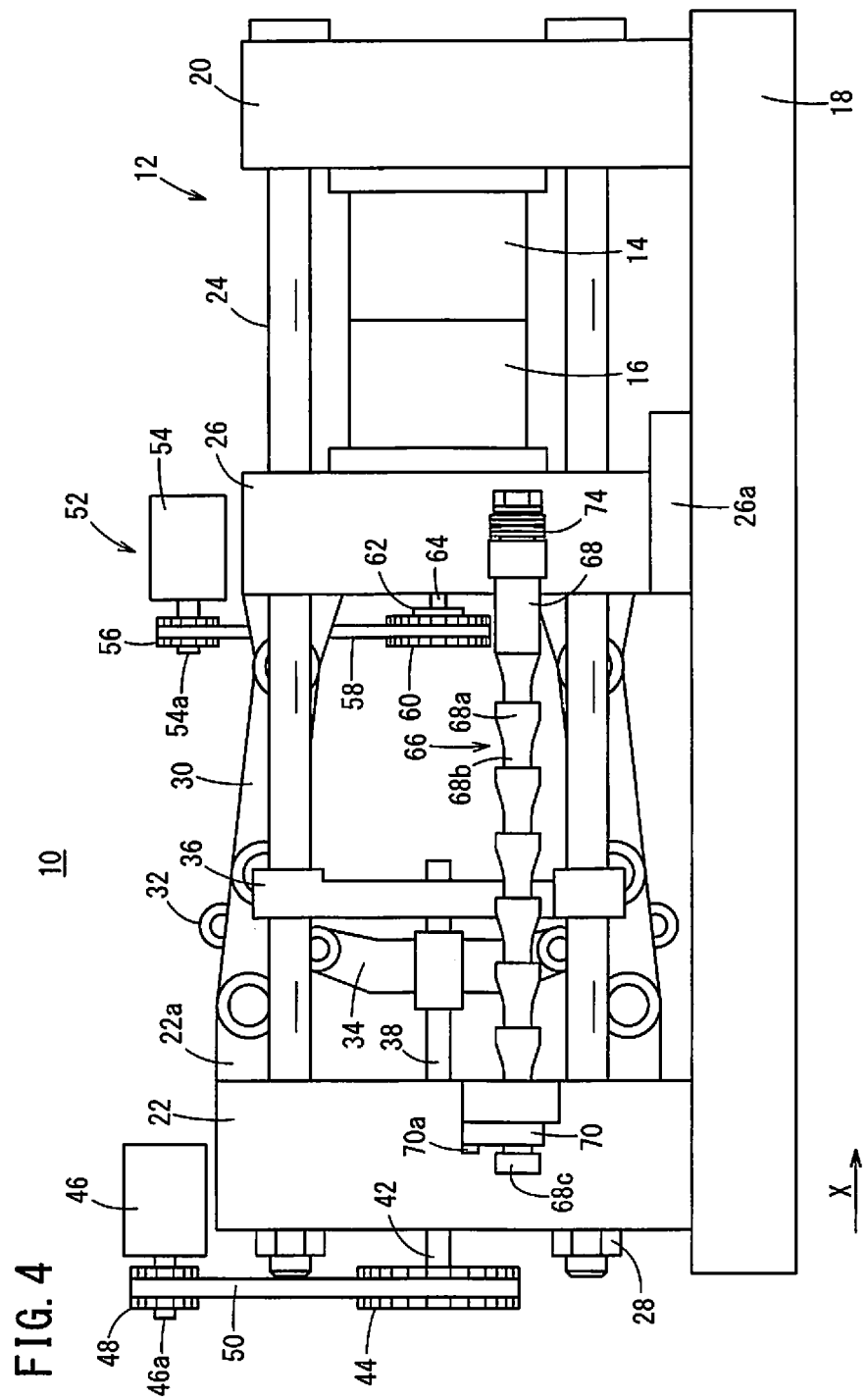
FIG. 4 is a view showing a schematic external configuration of a clamping device of a comparative example.
Figure 5:
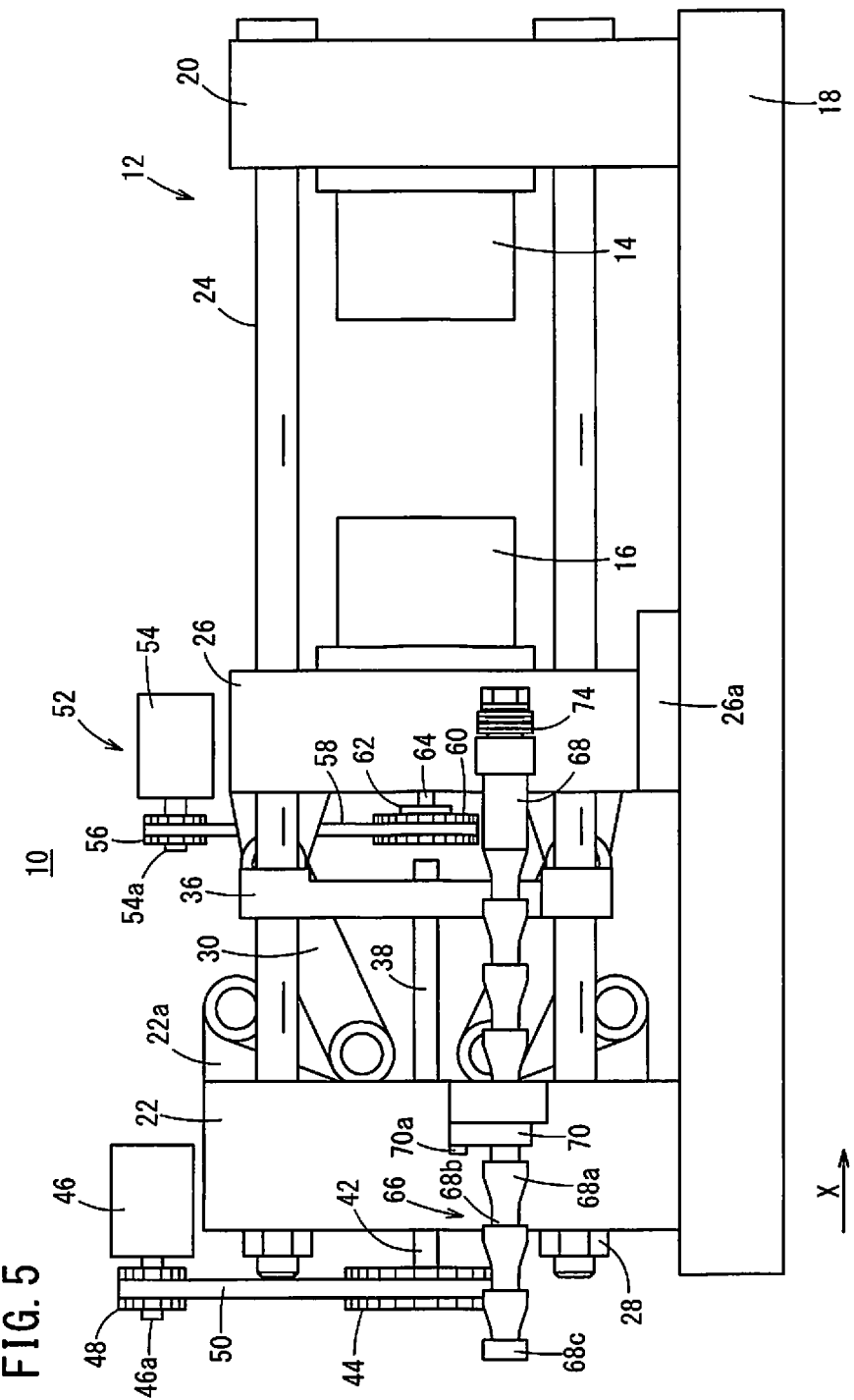
FIG. 5 is a view showing a schematic external configuration of a clamping device of a comparative example.

FIGS. 4 and 5 are views showing a schematic external configuration of a clamping device 12 of a comparative example. FIG. 4 is a view showing a state in which the mold is closed. FIG. 5 is a view showing a state in which the mold is open.

In the present embodiment, the safety latch 70 is provided in the guide rod support 36, whereas in the comparative example, the safety latch 70 is provided in the rear platen 22. In the comparative example, the length of the safety rod 68 has to be designed according to the distance between the moving platen 26 and the rear platen 22. Consequently, when the moving platen 26 moves rearward, the end portion of the safety rod 68 on the negative X-axis direction side protrudes in the negative X-axis direction from the driven pulley 44 and the like provided on the negative X-axis direction side of the rear platen 22, as shown in FIG. 5. Therefore, an unillustrated housing needs to cover the entire clamping device 12 including the above region where the safety rod 68 protrudes from the rear platen 22, so that a problem occurs that the entire injection molding machine 10 increases in size.

To deal with the above problem, in the present embodiment, the safety latch 70 is provided in the guide rod support 36 disposed between the moving platen 26 and the rear platen 22. Accordingly, the length of the safety rod 68 may be designed according to the distance between the moving platen 26 and the guide rod support 36. Therefore, it is possible to shorten the safety rod 68 as compared to the comparative example. That is, even when the moving platen 26 moves rearward, as shown in FIG. 2, the end of the safety rod 68 on the negative X-axis direction side does not protrude from the rear platen 22 in the negative X-axis direction side. Therefore, it is possible to suppress increase in size of the injection molding machine 10.

In the present embodiment, in order to arranged the safety latch 70 on the guide rod support 36, the positive X-axis direction side of the guide rod 38 is fixed to the guide rod support 36 by the nut 39 while the negative X-axis direction side is fixed to the rear platen 22 by the nut 40. When the safety latch 70 becomes engaged with the safety rod 68 while the moving platen 26 is moving in the positive X-axis direction, a force in the positive X-axis direction acts on the guide rod support 36. By fixing the guide rod support 36 to the rear platen 22 via the guide rod 38, the rear platen 22 can bear the force acting on the guide rod support 36.

Figure 6:
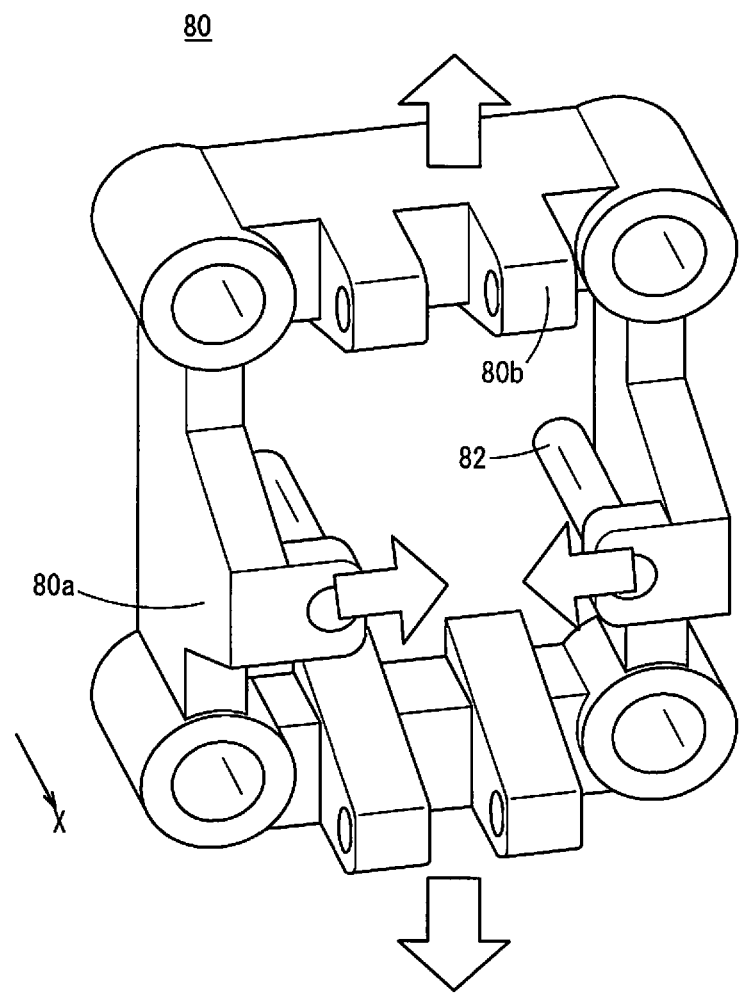
FIG. 6 is a perspective view of a rear platen of a comparative example.

FIG. 6 is a perspective view of a rear platen 80 of a comparative example. The rear platen 80 of the comparative example has a pair of extended portions 80a extending in the positive X-axis direction. A guide rod 82 is formed so as to extend from an end of each extended portion 80a on the positive X-axis direction side toward the negative X-axis direction side. That is, the guide rod 82 is formed integrally with the rear platen 80. In the rear platen 80 of the comparative example, an unillustrated safety latch can be arranged in the extended portion 80a so as to shorten an unillustrated safety rod. However, when the mold is clamped, a force is applied to link joints 80b of the rear platen 80 from the unillustrated toggle links in a direction to press the link joints outward in the un-and-down direction. As a result, the positive X-axis direction side of each extended portion 80a is deformed inward or in the closing direction with respect to the lateral direction when viewed from the positive X-axis direction. Therefore, the guide rods 82 are deformed so that there is a risk that the unillustrated cross head can not smoothly move.

To avoid such a risk, in the present embodiment, a positive X-axis direction side end of the guide rod 38 is fixed to the guide rod support 36. A negative X-axis direction side end of the guide rod 38 is fixed near the vertical center of the rear platen 22 on the negative X-axis direction side of the rear platen 22. As a result, even when force is applied to link joints 22a of the rear platen 22 in such directions as to press the link joints 22a outward in the vertical direction, the vertical center of the rear platen 22 is less deformed than the other portions. That is, deformation of the negative X-axis direction side end of the guide rod 38 that is fixed at the less deformed position can be suppressed. Further, since the guide rod support 36 is formed separately from the rear platen 22, it is possible to suppress deformation of the end portion of the guide rod 38 on the positive X-axis direction side.

Second Embodiment

Figure 7:
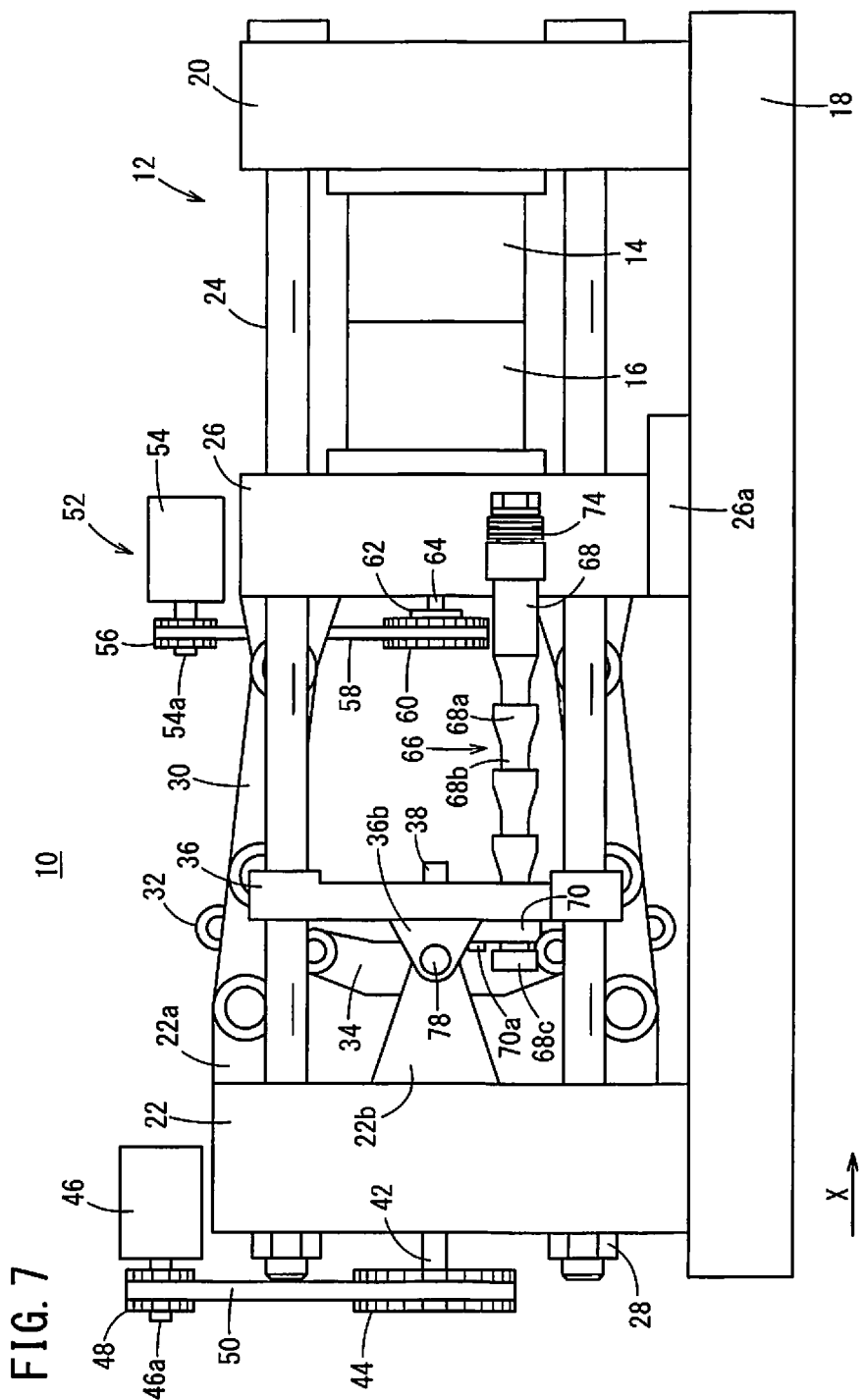
FIG. 7 is a view showing a schematic external configuration of a clamping device of an injection molding machine according to another embodiment of the present invention.

FIG. 7 is a view showing a schematic external configuration of a clamping device 12 of an injection molding machine 10 according a second embodiment. A rear platen 22 has an extended portion 22b extending in the positive X-axis direction. Further, a guide rod support 36 has an extended portion 36b extending in the negative X-axis direction. The extended portion 22b of the rear platen 22 and the extended portion 36b of the guide rod support 36 partially overlap each other in the X-axis direction while the extended portion 22b of the rear platen 22 is disposed inside the extended portion 36b of the support 36.

The extended portion 22b and the extended portion 36b are coupled with each other by a pin 78 arranged perpendicularly to the moving direction (X-axis direction) of the moving platen 26 and laterally as seen from the X-axis direction. The pin 78 is provided with a stopper structure (not shown) so as to prevent the pin 78 from dropping out of the extended portion 22b and the extended portion 36b. The pin 78 is formed so as to have a length larger than the thickness of the extended portion 22b and the extended portion 36b, and so as to be movable to some extent in the axial direction of the pin 78 relative to the extended portion 22b and the extended portion 36b.

Although the guide rod 38 is not visible in FIG. 7, the guide rod 38 is provided on the other side of the extended portion 22b and the extended portion 36b in FIG. 7. In the second embodiment, the guide rod 38 is fixed to the guide rod support 36 by a nut 39 or the like, but does not necessarily have to be fixed to the rear platen 22. The force to fix the guide rod 38 to the guide rod support 36 may have any magnitude as long as the guide rod 38 will not move when the cross head 34 is moved along the guide rod support 36.

[Operation and Effect]

As described above, when the mold is clamped, a force is applied to the link joints 22a of the rear platen 22 from the toggle link 30 in a direction to press the link joints outwards in the un-and-down direction. As a result, the positive X-axis direction side of the extended portion 22b is deformed inward or in the closing direction with respect to the lateral direction when viewed from the positive X-axis direction.

In the present embodiment, the extended portions 22b, 36b are connected by the pin 78 which is arranged perpendicularly to the X-axis direction and laterally when viewed from the X-axis direction. As a result, the force in the X-axis direction can be transmitted between the guide rod support 36 and the rear platen 22. Therefore, when the safety rod 68 is locked by the safety latch 70 while the moving platen 26 is moving in the positive X-axis direction, the rear platen 22 can receive the force in the moving direction of the moving platen 26 (in the positive X-axis direction), acting on the guide rod support 36.

Further, in the present embodiment, the extended portion 22b of the rear platen 22 is disposed inside the extended portion 36b of the guide rod support 36, and the pin 78 is arranged so as to be movable to some extent in the axial direction of the pin 78 with respect to the extended portions 22b, 36b. As a result, the force deforming the extended portion 22b of the rear platen 22 inwardly or in the closing direction is not transmitted to the extended portion 36b of the guide rod support 36. Thus, deformation of the guide rod support 36 can be suppressed, and hence deformation of the guide rod 38 can be suppressed.

Modification 1

In the first embodiment, the guide rod 38 is fixed to the guide rod support 36 and the rear platen 22. However, as long as the guide rod support 36 is fixed in another manner so as to be able to receive the force acting on the safety latch 70, the guide rod 38 does not necessarily need to be fixed to both the guide rod support 36 and the rear platen 22.

For example, the guide rod support 36 may be fixed to the tie bars 24. In this case, as in the second embodiment, the guide rod 38 is fixed to the guide rod support 36 by the nut 39 or the like, whereas the guide rod does not necessarily need to be fixed to the rear platen 22. The force to fix the guide rod 38 to the guide rod support 36 only has to have such a magnitude that does not allow movement of the guide rod 38 when the cross head 34 is moved along the guide rod support 36.

Modification 2

In the second embodiment, the extended portion 22b of the rear platen 22 is disposed on the inner side of the extended portion 36b of the guide rod support 36. However, arranging of the extended portion 22b of the rear platen 22 and the extended portion 36b of the guide rod support 36 is not particularly limited as long as the force acting on the extended portion 22b of the rear platen 22 in the inwardly closing direction is not transmitted to the extended portion 36b of the guide rod support 36.

For example, a configuration may be adopted in which the extended portion 22b of the rear platen 22 is arranged on the outer side of the extended portion 36b of the guide rod support 36, with a clearance or space between the extended portion 22b and the extended portion 36b.

Technical Concepts Obtained from the Embodiments

Technical concepts that can be grasped from the above embodiment will be described below.

The injection molding machine (10) includes: the moving platen (26) connected to the rear platen (22) via the toggle link (30) and configured to be moved closer to and away from the stationary platen (20); the guide rod support (36) provided between the rear platen (22) and the moving platen (26) and configured to support the guide rod (38) for guiding the cross head (34) of the toggle link (30); the safety rod (68) fixed to the moving platen (26) and extending toward the guide rod support (36); and the safety latch (70) provided on the guide rod support (36) and configured to restrict movement of the moving platen (26) by engagement with the safety rod (68). As a result, it is possible to suppress increase in size of the injection molding machine (10).

In the above injection molding machine (10), the guide rod support (36) may be fixed to the rear platen (22) via the guide rod (38). With this structure, the force acting on the guide rod support (36) can be received by the rear platen (22).

In the above injection molding machine (10), the guide rod support (36) may be supported on the rear platen (22) via the pin (78) so as to be movable in the axial direction of the pin (78), the pin (78) being arranged perpendicularly to the moving direction of the moving platen (26). With this structure, the rear platen (22) can receive the force acting on the guide rod support (36) in the moving direction of the moving platen (26). On the other hand, the force in the direction perpendicular to the moving direction of the moving platen (26) due to deformation of the rear platen (22) is not transmitted to the guide rod support (36), so that deformation of the guide rod (38) can be suppressed.

While the invention has been particularly shown and described with reference to the preferred embodiments, it will be understood that variations and modifications can be effected thereto by those skilled in the art without departing from the scope of the invention as defined by the appended claims.

What is claimed is:

1. An injection molding machine comprising:
   a moving platen connected to a rear platen via a toggle link and configured to be moved closer to and away from a stationary platen;
   a guide rod support provided between the rear platen and the moving platen, and configured to support a guide rod configured to guide a cross head of the toggle link;
   a safety rod fixed to the moving platen and extending toward the guide rod support;
   a mold opening/closing motor that moves the cross head;
   a driven pulley that transmits force of the mold opening/closing motor to the cross head and is disposed at an opposite side of the rear platen from the moving platen; and
   a safety latch provided on the guide rod support and configured to restrict movement of the moving platen by engagement with the safety rod,
   wherein a length of the safety rod is such that the safety rod does not protrude on an opposite side of the driven pulley from the moving platen when the moving platen moves towards the rear platen, wherein the guide rod support has an extended portion extending toward the rear platen, and the rear platen has an extended portion extending toward the guide rod support, the extended portion of the guide rod support being coupled to the extended portion of the rear platen via a pin, such that the extended portion of the guide rod support is movable relative to the rear platen along an axis defined by the pin.

2. The injection molding machine according to claim 1, wherein the guide rod support is fixed to the guide rod.

3. The injection molding machine according to claim 1, wherein the pin is arranged perpendicularly to a moving direction of the moving platen.

4. The injection molding machine according to claim 1, wherein the extended portion of the rear platen is disposed inside of the extended portion of the guide rod support.

5. The injection molding machine according to claim 1, wherein the pin has a greater length than a thickness of the extended portion of each of the rear platen and the guide rod support.

* * * * *